United States Patent [19]

Brantman et al.

[11] Patent Number: 4,721,329
[45] Date of Patent: Jan. 26, 1988

[54] ELASTICALLY RESTORING KNEE BOLSTER FOR MOTOR VEHICLES

[75] Inventors: Russel Brantman, New City, N.Y.; John N. Hatfield, Long Valley, N.J.

[73] Assignee: Breed Corporation

[21] Appl. No.: 850,950

[22] Filed: Apr. 11, 1986

[51] Int. Cl.⁴ .......................................... B60R 21/045
[52] U.S. Cl. ..................................... 280/751; 180/90
[58] Field of Search ............... 280/727, 728, 748, 751, 280/752; 180/90; 296/37.12, 70

[56] References Cited

U.S. PATENT DOCUMENTS

| | | | |
|---|---|---|---|
| 3,897,848 | 8/1975 | Arnstson et al. | 180/90 |
| 3,922,429 | 11/1975 | Welch et al. | 180/90 |
| 3,984,128 | 10/1976 | Oehm et al. | 280/751 |
| 4,273,359 | 6/1981 | Scholz et al. | 280/751 |

Primary Examiner—John J. Love
Assistant Examiner—Karin L. Ferriter

[57] ABSTRACT

In an automobile, a knee bolster is provided, with either an airbag or shoulder belt, for capturing and absorbing the translational kinetic energy of the occupant's lower torso, for prevention of submarining, and for controlled rebound. The bolster includes a member for capturing and dissipating a portion of the kinetic energy of an occupant during a collision, and a member for storing another portion of said kinetic energy. A collision between the lower portion of the body of the occupant and the bolster tends to restore the body in such a way that the rebound impact against the seat is applied to the occupant's back rather than his head or neck.

12 Claims, 9 Drawing Figures

ELASTICALLY RESTORING KNEE BOLSTER FOR MOTOR VEHICLES

BACKGROUND OF THE INVENTION

A. Field of Invention

This invention pertains to a knee bolster to be used in a motor vehicle usually in conjunction with either an airbag or shoulder belt to protect a passenger from injury during frontal-type collisions, and more particularly to a bolster which elastically saves a portion of the collision energy to provide a controlled rebound of the occupant against the seatback, such that the rebound impact forces on the occupant's head or neck are minimized.

B. Description of the Prior Art

Studies have shown that during a frontal automobile crash, an occupant first moves forward (at substantially the original speed of the automobile) with respect to the automobile's body, and then rebounds towards the seat. Thus, he can suffer serious injuries not only from the first impact but also during the second impact with the seat. This second impact is usually termed secondary collision. While occupant restraints (such as seat belts) were found to alleviate such injuries, even with protective legislation passed by several states, the public is not ready to accept these restraints because of various inconveniences to the occupants.

Alternate solutions have also been proposed, including passive restraints such as airbags and automatic shoulder belts with conventional knee bolsters. In a vehicle so equipped, the restraint acts to absorb the kinetic energy of the occupant during the primary impact so that, theoretically, the occupant would escape with little or no injuries. However, it was found that even with such restraints, some occupants were still getting injured. Further studies have shown that these injuries can be attributed to the fact that the chest restraint does not dissipate all the kinetic energy of the occupant but instead stores at least a portion of it and then reflects the stored energy back to the occupant in a semi-elastic collision during the primary impact resulting in a secondary collision against the back of the seat. More particularly, it was found that since the impact between the occupant and the chest restraint is centered in the upper chest area, i.e. above the occupant's center of gravity, the occupant is subject to both a translation (i.e. backward) and a rotation (with the upper torso turning away from the front end of the vehicle). As a result of this rotation, the upper portion of the occupant's body (i.e. the head and the neck) impacts first during the secondary collision with the seatback. Since this part of the body is very fragile, even a minor secondary impact could result in injuries.

OBJECTIVES AND SUMMARY OF THE INVENTION

In view of the above, it is a principal objective of this invention to provide a means for eliminating the undesirable rearward rotation of an automobile occupant following a primary impact in a collision, whereby injuries in the subsequent secondary impact are reduced or even eliminated.

A further objective is to provide a means which insures that in the secondary collision, the occupant's middle or lower body portion impacts the back of the seat first.

A further objective is to provide a means whereby the forces from the knee bolster are not concentrated directly on the occupant's knees, thus minimizing the possibility of direct injury to these sensitive parts.

A further objective is to provide a means which insures that the occupant's knees are captured by the knee bolster and do not slide across it in frontal crashes that occur at an angle.

Other objectives and advantages of the invention shall become apparent from the following. These objectives are attained by a knee bolster constructed to capture and absorb the kinetic energy of the occupant's lower body during the primary impact, but with said bolster being adapted to store and redirect a portion of said energy to the occupant's lower portion of the body to complement the rebound action of the chest restraint. Additionally, the knee bolster is positioned to contact the knees and the tibia of the occupant essentially simultaneously so that the force of the primary impact is evenly distributed over these members.

DETAILED DESCRIPTION OF THE INVENTION

Figure 1:
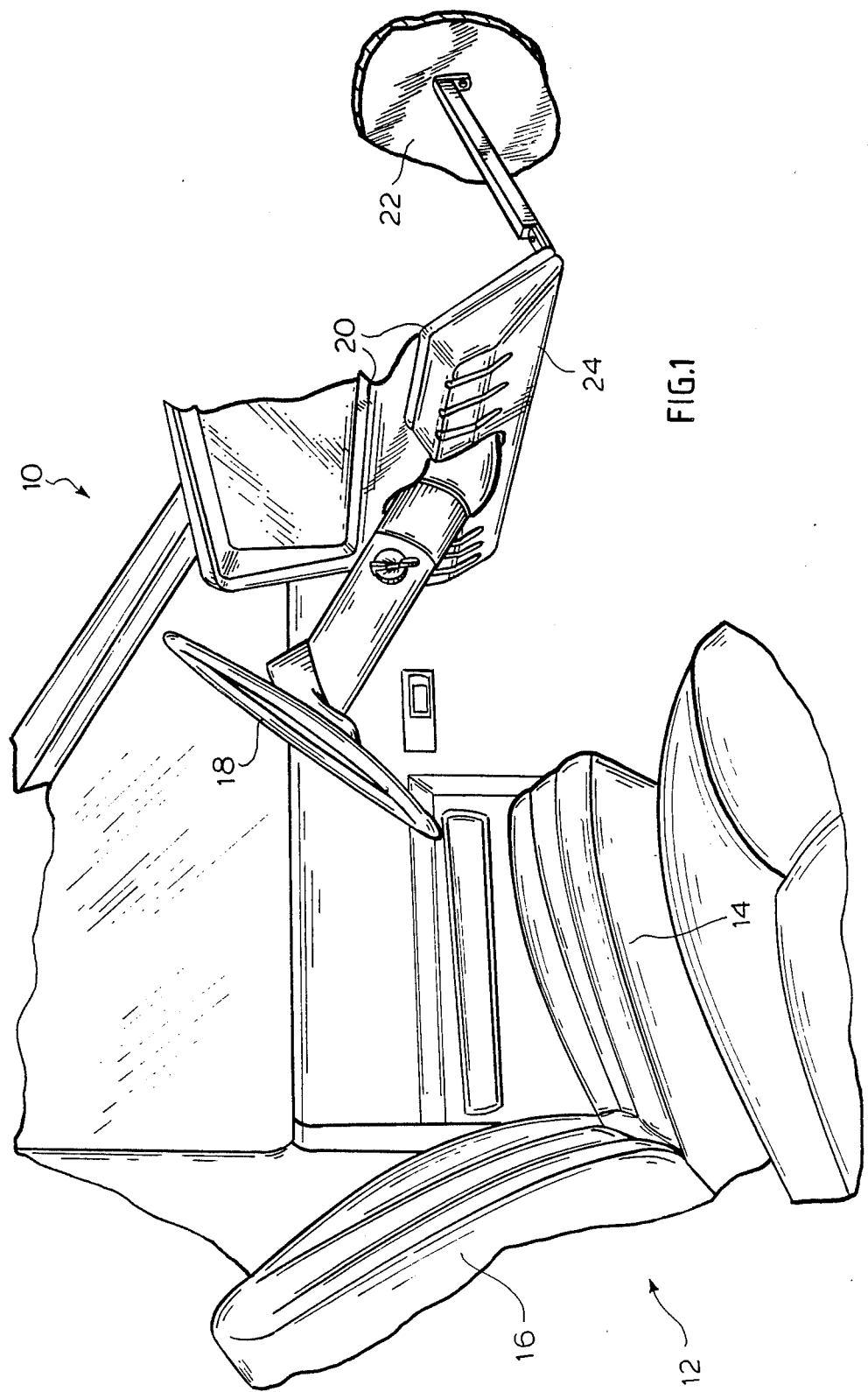
FIG. 1 shows a partial side-sectional view of the inside compartment of an automobile with a knee bolster in accordance with this invention.

FIG. 1 shows the interior of an automobile with the knee bolster. In this figure, the knee bolster is shown under the instrument panel for protecting the driver. However, similar knee bolsters could be placed at other locations within the automobile for protecting other occupants.

The vehicle 10 of FIG. 1 includes a seat 12, with bottom 14 and seatback 16, a steering wheel 18 (which may include an airbag, not shown) a dashboard 20, a fire wall 22, and a knee bolster 24.

For the purposes herein, dashboard is defined to include the vehicle instrument panel, dashboard, and supporting structure. For the purposes herein, vehicle shall include automobiles, trucks, boats, airplanes, and motorcycles.

Figure 3:
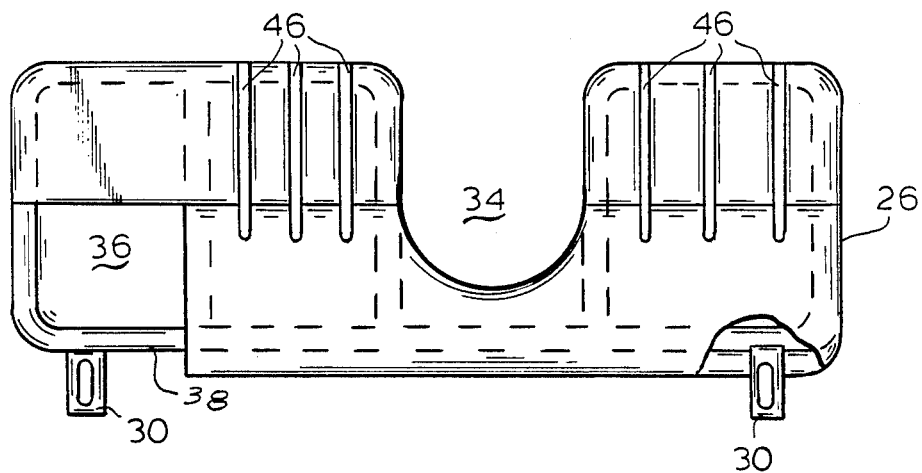
FIG. 3 shows a plane view of the knee bolster.
Figure 2:
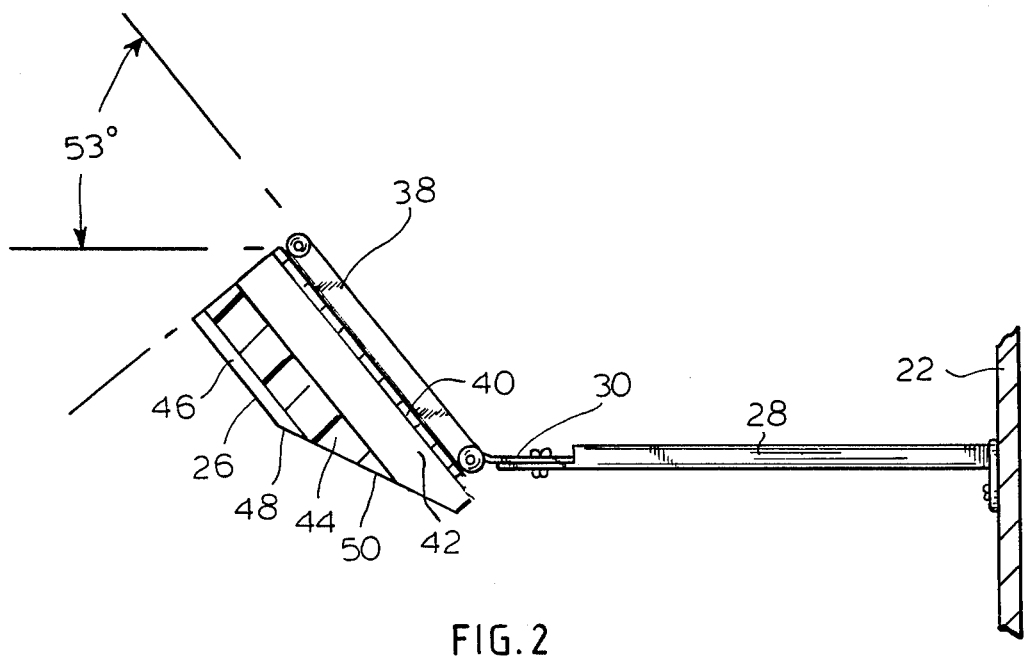
FIG. 2 shows a sectional view of the knee bolster.

As shown in FIGS. 2 and 3 the knee bolster comprises a box-type structure 26, with two brackets 30 for securement to the dashboard and to support braces 28 extending horizontally back to the fire wall 22. As shown in FIG. 2, the bolster is typically set at an angle of about 53° with respect to the horizontal axis, so as to distribute the impact loading uniformly over the occupant's knee and tibia. (The actual angle should correspond to the tibia angle at bolster contact, with the occupant's heels located at the toeboard-to-floorboard junction).

The bolster 26 is also provided with a U-shaped opening 34 to accommodate the sterring column, and an opening 36 in the lower left hand corner to give access to a hood release latch, an emergency brake, or other similar devices located under the dash board.

The bolster 26 includes a frame 38 which provides rigidity to the box structure, and may be made of a ⅝"×0.065" metal tubing. Attached to the frame 38 is a deformable metal backing plate 40 which may be made of 20 gauge sheet metal. The next layer is an elastic polyethylene foam layer 42, having a density of about 6 lbs/ft$^3$, and being about one and a half inch thick. This layer is very resilient and is designed to store and release energy on impact. the outermost layer 44 is a layer of crushable polystyrene foam, about one and a half inches thick, and having a density of about 2 lbs/ft$^3$. This layer absorbs and dissipates energy on impact by permanent deformation. A plurality of ½ inch deep vertical grooves 46 are cut into the outer layer, as shown in FIG. 3. These grooves provide the mechanism for positive knee capture by causing the outer layer to crush only within the grooves that directly bound the occupant's knee.

The backing plate 40 and foam layers 42 and 44 are wrapped in a vinyl cover 48. The lower front portion of the bolster 26 may be slanted as at 50 to increase the normal leg spacing available for the occupant within the automobile and to minimize interference with the normal operation of the automobile. The inner layer of foam 42 should extend at least ¾ of an inch below the frame 38 to provide cushioning protection for the occupant's shins.

Figure 4:
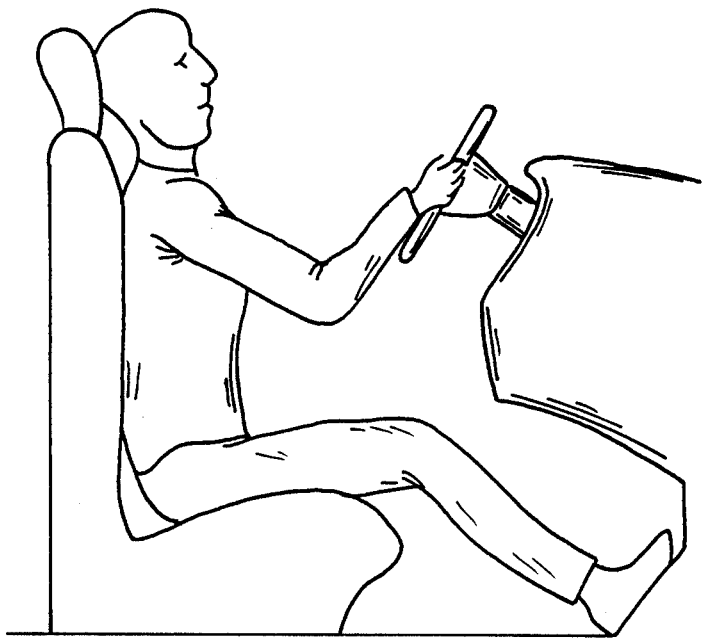
FIGS. 4-6 show the forces experienced by the occupant of an automobile without the present invention.
Figure 5:
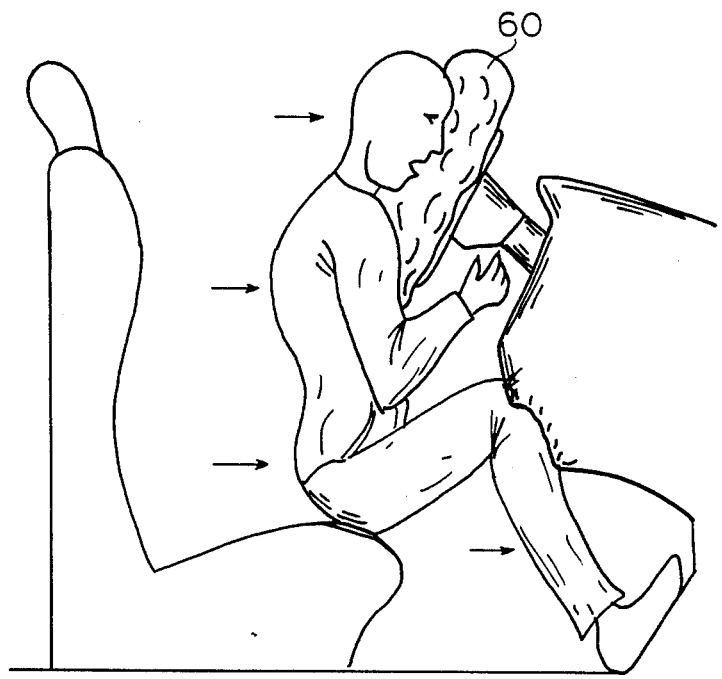
Figure 6:
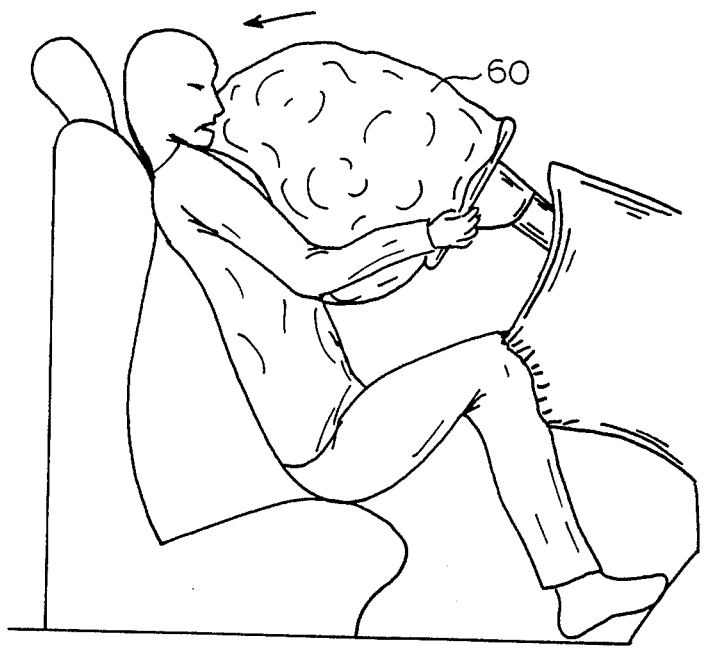

A typical sequence of events in an automobile with an airbag (or shoulder belt), but without a knee bolster (or with only a conventional knee bolster is shown in FIGS. 4–6. FIG. 4 shows the normal position of the driver just prior to the collision. In FIG. 5, just after the collision, the body of the driver moves forward and his kinetic energy is absorbed by an airbag 60. As previously explained, the airbag (or shoulder belt) dissipates only a part of this kinetic energy. Accordingly, a semi-elastic collision takes place between the upper body (or chest) of the driver and the chest restraint device, as a result of which the driver's upper body is simultaneously pushed toward the seatback and rotated counterclockwise as seen in FIG. 6. Therefore, the driver's head (and/or neck) hit the upper portion of the seatback absorbing all the impact of the secondary collision.

Figure 7:
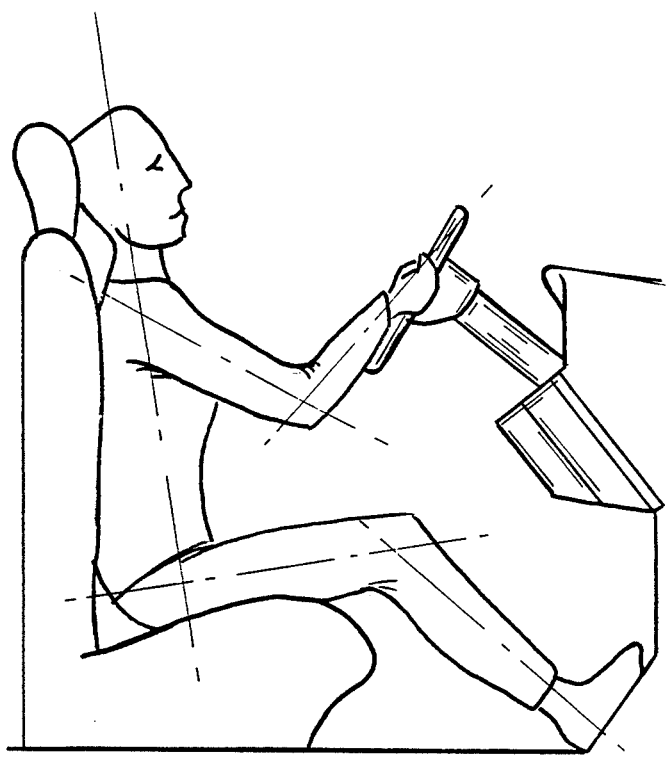

This is to be contrasted with the sequence taking place in an automobile with the semi-elastic knee bolster described herein. In FIG. 7, the driver is shown again in a normal position, just prior to the collision.

Figure 8:
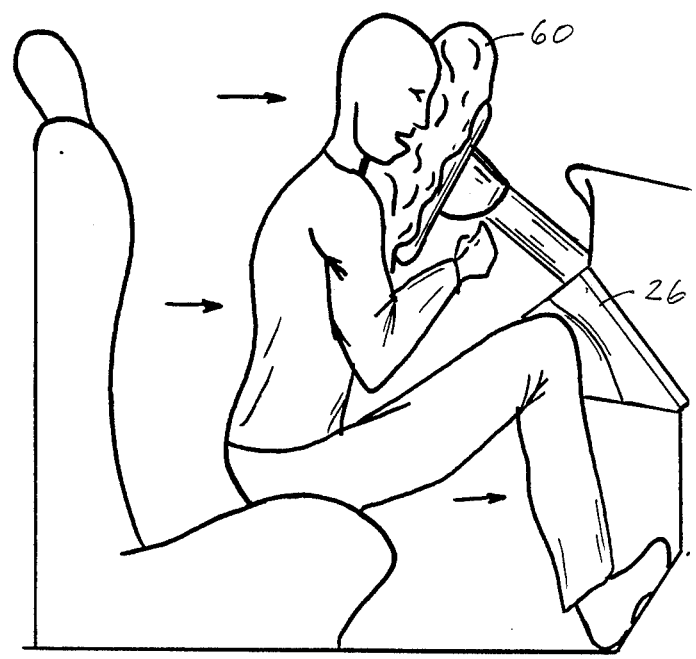

Immediately after the frontal collision, as the driver's body moves forward, while his upper body is cushioned by the air bag 60 (or shoulder belt), his knees come in contact with and start compressing the knee bolster 26 (FIG. 8). Because of the specific angle selected for the bolster, this contact is not limited to the knee, but is distributed uniformly over the tibia. Otherwise, if all contact is limited to the knees, the concentrated forces generated during the primary impact may seriously damage the knee.

As the knees and tibia penetrate the bolster, the foam layers 42 and 44 start deforming. Layer 44 is crushed and permanently deforms under the primary impact, around the knees and the tibia, while layer 42 deforms resiliently. Importantly, layer 44, as it crushes, forms a formfitting restraining pocket for the knees and the tibia, due to the precut vertical grooves 4–6. This pocketing that occurs upon knee impact prevents the knees from sliding sideways across the bolster, and is especially important in angle crashes. The forces exerted by the lower body of the driver are transmitted by the backing plate 40 and the frame 38 to the lower portion of the dashboard 20. It is expected that a major portion of these forces are absorbed by this dashboard, forcing the dashboard and the brackets 30 to collapse. It should be noted that the inner layer of foam 42 extends below the frame 38 so that the occupant's shins are protected during impact and subsequent dashboard collapse.

Figure 9:
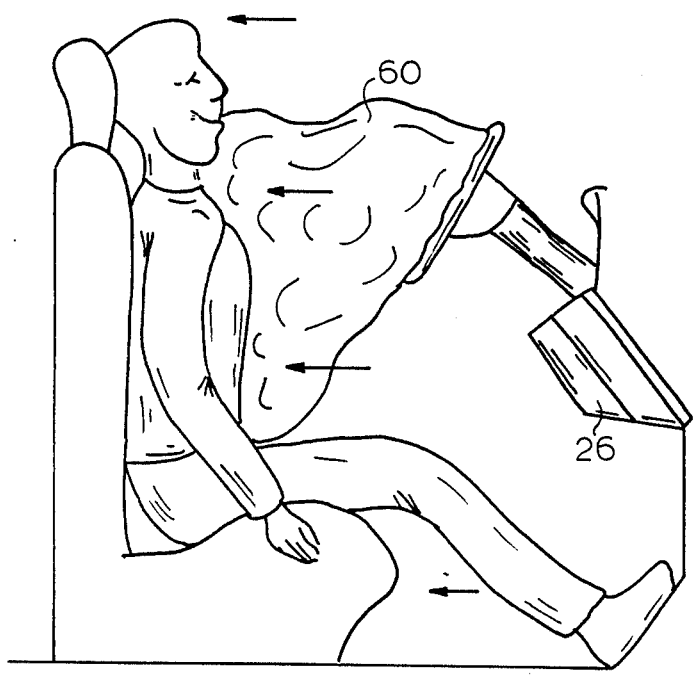
FIGS. 7-9 show the forces experienced by the occupant of an automobile equipped with a knee bolster constructed in accordance with this invention.

As soon as the forward motion of the lower body of the driver is completely absorbed, the resilient layer 42, which has stored a portion of the kinetic energy of the body, pushes the lower portion of the body resiliently backwards away from the front of the automobile (FIG. 9). Since this force is exerted below the driver's center of gravity, it tends to rotate him forward thereby counteracting the effect of the airbag 60 (or shoulder belt), so that on the secondary impact the driver's back and lower torso hits the seat before the head or neck.

The resilient layer 42 may be alternatively made of other materials or a plurality of springs designed to act in parallel with the description of movement of the automobile. Obviously numerous other modifications may be made to the invention without departing from its scope.

What is claimed is:

1. A device for engaging the knees of a vehicle occupant during a collision, said device comprising: a frame; a deformable backing plate disposed on said frame; a layer of resilient material disposed on said backing plate and positioned to store kinetic energy from said lower body portion during collision and then retransmit the stored energy to said lower body portion by applying a restoring force thereto a layer of crushable material which absorbs energy from said lower portion by permanent deformation wherein said layer of resilient material is disposed between said layer of crushable material and said backing plate; and support brace means for securing said frame to said vehicle body.

2. The device of claim 1 wherein said frame, backing plate, layer of crushable material, and layer of resilient material have a box-type shape.

3. The device of claim 2 wherein said frame comprises a tubular frame.

4. The device of claim 3 wherein said vehicle body includes a dashboard and said support brace means comprises a pair of braces extending between said device and said dashboard.

5. The device of claim 1 wherein said layer of crushable material is disposed to restrain said knee from sliding sideways upon impact.

6. The device of claim 5 wherein said layer of crushable material is provided with vertical grooves in the area of impact positioned for capturing the knee upon impact.

7. The device of claim 1 wherein said layer of resilient material comprises polyethylene foam.

8. The device of claim 1 wherein said layer of crushable material comprises polystyrene foam.

9. The device of claim 1 wherein said structure is positioned at an angle corresponding to the tibia angle when knee contact occurs.

10. The device of claim 1 wherein the structure is positioned at an angle which is the same as the angle determined by placing the occupant's heels at the toeboard-to-floorboard junction and sliding his body forward until knee contact occurs.

11. A vehicle holding an occupant comprising:
a car body;
an airbag or shoulder belt disposed on said car body for absorbing the energy of said occupant's upper body during collision, said airbag applying a first force on said occupant which tends to rotate said occupant in a first direction; and a knee bolster disposed on said car body for storing the energy of said occupant's lower body during collision such that said knee bolster may apply a second force on said lower body which tends to rotate said occupant in a second direction opposite said first direction and wherein said knee bolster is a structure comprising a frame, a resilient layer for storing one portion of the energy of the lower body, a crushable layer disposed above said resilient layer for dissipating another portion of said energy, and a deformable backing plate disposed on said frame and a support brace for securing said frame to said body.

12. The automobile of claim 11 wherein said automobile body includes a dashboard, and said knee bolster is secured to said dashboard.

* * * * *